US005974602A

United States Patent [19]

Theander

[11] Patent Number: 5,974,602

[45] Date of Patent: Nov. 2, 1999

[54] REMOTE CONTROL AND INDICATION SYSTEM FOR ELECTRICAL DEVICES

[76] Inventor: Peter Theander, Hissnabben, S-355 92 Vaxjö, Sweden

[21] Appl. No.: 09/051,177

[22] PCT Filed: Oct. 4, 1996

[86] PCT No.: PCT/SE96/01255

§ 371 Date: Jun. 11, 1998

§ 102(e) Date: Jun. 11, 1998

[87] PCT Pub. No.: WO97/13231

PCT Pub. Date: Apr. 10, 1997

[30] Foreign Application Priority Data

Oct. 6, 1995 [SE] Sweden .................................. 9503464

[51] Int. Cl.[6] .............................. G05D 23/00; A47K 3/00

[52] U.S. Cl. ............................ 4/541.1; 417/44.1; 417/63; 362/562; 116/202

[58] Field of Search ................................ 4/492, 493, 496, 4/497, 524, 541.1–541.6, 545, 603, 213–215; 200/331, DIG. 44; 116/202; 359/142–144; 362/562; 137/557; 604/65–67, 131; 340/531, 815.42, 679, 691.1; 417/825–825.17, 44.1, 63

[56] References Cited

U.S. PATENT DOCUMENTS

| | | | |
|---|---|---|---|
| 4,844,333 | 7/1989 | Davis et al. | 4/541.1 |
| 4,850,536 | 7/1989 | Teranishi et al. | 239/332 |
| 4,861,231 | 8/1989 | Howard | 4/541.2 |
| 5,491,617 | 2/1996 | Currie | 362/562 |

*Primary Examiner*—Henry J. Recla
*Assistant Examiner*—Tuan Nguyen
*Attorney, Agent, or Firm*—James Ray & Associates

[57] ABSTRACT

A remote control and indication system for an electric device (20, 22) in a sanitary environment comprises: at least one light carrier (42; 50) for indicating operational status information about the electric device to a user present in the sanitary environment, a first end (43) of said light carrier receiving light from at least one light source (46; 56*a–b*) in response to the operational status of the electric device; and control means (40; 52) for controlling at least one function of the electric device (20, 22), said control means being connected by at least one pneumatic or hydraulic pressure line (41; 51) to the electric device. The control means (40; 52) and a second end (44) of the light carrier (42; 50) are adjacently arranged at a position in the sanitary environment, which is visible and accessible to the user.

14 Claims, 3 Drawing Sheets

REMOTE CONTROL AND INDICATION SYSTEM FOR ELECTRICAL DEVICES

FIELD OF THE INVENTION

The present invention relates to a remote control and indication system for an electric device in a sanitary environment.

DESCRIPTION OF THE PRIOR ART

In our modern society electricity is used as a power source for almost all kinds of applications. In our daily lives we constantly come across electricity, often without even noticing it. The above is particularly true in our homes, in which electrical applications are well-known with respect to lighting and heating as well as operation of all kinds of electrical devices. It should be obvious to all of us, that the use of electrical power sources requires a certain amount of caution with regard to the risks connected to such use. For instance, shorted electrical lines may generate sparks or heat, which may lead to a fire. Furthermore, the human body is—as well as other living organisms—sensitive and vulnerable, if electric current is allowed to flow through it as a consequence of e.g. a short circuit or a ground fault. For this reason the use of electricity is surrounded by various laws, rules, and regulations.

In certain areas the risks of accidents are higher than usual. Such areas are e.g. production and distribution of electrical power, which involves very high voltages. This is true also for many industrial applications. A field most private people get into contact with is sanitary environments, such as bathrooms, steam saunas, laundry rooms, or other wet rooms. The increased risks of personal injuries or even deaths as a consequence of electrical accidents in such sanitary environments are due to the potentially dangerous combination of a substantially naked human body and the presence of water, which in some cases is a fairly good conductor of electric current.

An example of an electric mains-operated device in a sanitary environment is a pump motor, which is arranged to pump air-mixed water jets through jet outlets in a whirlpool or a bubble bath tub. Other examples are the steam generator in a steam sauna, various types of heating devices, etc.

According to present regulations for sanitary environments the different positions of switches, actuators or controls must be visibly indicated. In some cases such indication may be carried out by marking the different positions of e.g. a rotary switch by means of digits or letters. In other cases, e.g. when it comes to different kinds of push buttons or touch controls, indication must be carried out in another way, for example by means of a light emitting diode.

Hence, in the bubble bath tub example, it must be indicated to any person present, that a pump motor used in the actual application is operating. Such indication may be realised by turning on and off, respectively, a light source mounted e.g. on the edge of the bath tub in response to the pump motor being in operation or not. However, according to the existing regulations, it is not permitted to directly supply the indication light source mentioned above, which is within reach of a user of the bubble bath, with power from a mains voltage of e.g. 230 V, which is used by the pump motor. The reason for this is obvious; such a mains voltage could cause highly dangerous and even lethal currents in case of an electric fault such as a short circuit. Instead, the regulations state that devices, which are within reach of a bathing person, may only be connected to so called extra-low protection voltage of maximum 12V. Furthermore, the power source must be mounted in areas or zones allowed in the regulations.

For similar reasons the actuators or control means for controlling the pump motor operation may only be driven by a low voltage. Hence, it is previously known to arrange a down transforming means between a mains-operated heavy current source and the indication and control means. Such transforming means may be realised as a circuit board, comprising a transformer for 12V DC. However, such a solution requires components, which are both expensive and space-consuming.

U.S. Pat. No. 4,398,789 discloses an electronic microcomputer-controlled bathing system, where the safety of the user is assured by fibre-optical remote control. Electrically safe optical control means are arranged at the bathing location within reach of the user. The optical control means are preferably optical touch switches operating by the amount of light reflected from the user's finger tip. Optical fibres connect the optical control means to the electronic controller, which controls various bathing functions and parameters, such as valves, pumps, water conditions, etc. Although satisfactory with regard to safety aspects, the system has major drawbacks when it comes to cost and complexity. For instance, the use of an electronic microcomputer-based controller with fibre-optical interfaces implies expensive components as well as difficulties regarding the integration with other parts of the system.

SUMMARY OF THE INVENTION

It is an object with the present invention to provide a remote control and indication system for an electric device in a sanitary environment (e.g. a water pump motor for a bubble bath). In particular the present invention is directed at a non-electric remote control and indication system, which may be realised without any need for expensive components and which hence may be manufactured at a substantially lower cost than previously known systems.

The object of the invention is achieved by a system with features according to the appended independent patent claims. Preferred embodiments of the invention are disclosed in the successive dependent claims.

BRIEF DESCRIPTION OF THE DRAWINGS

The invention will be described in more detail in the following with reference to the accompanying drawings, in which.

DETAILED DESCRIPTION OF THE INVENTION

Figure 1:
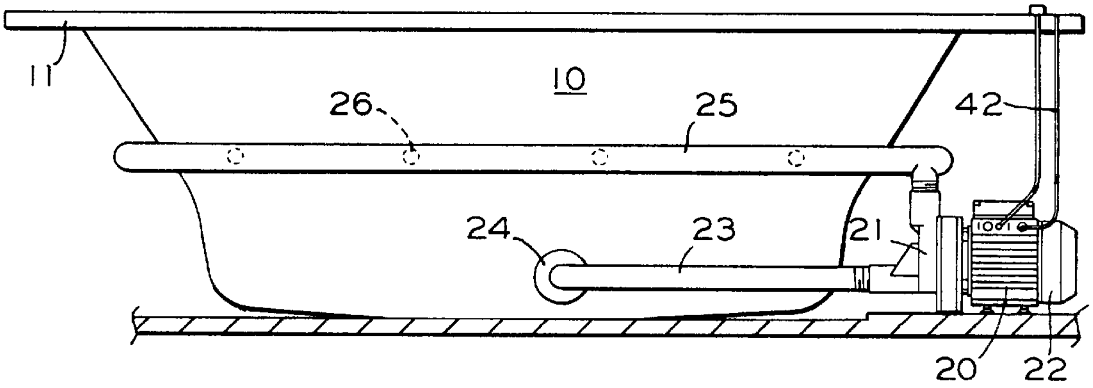
FIG. 1 is schematic view of a bubble bath tub and a water pump when used together with the system according to the invention.

In FIG. 1 there is shown an example of a sanitary environment, in which the present invention may be applied. A conventional bubble bath tub 10 is arranged in e.g. a bathroom. A pump 20, consisting of a pump housing 21 and a electric pump motor 22, is arranged in connection to the bubble bath tub 10. A suction pipe 23 is connected to the pump 20 and is arranged on the exterior of the bubble bath tub just above its bottom plane. An end of the suction pipe 23 facing away from the pump is connected to a suction valve 24 in the bubble bath tub. A pressure pipe 25 is also connected to the pump 20 and is arranged around the bubble bath tub along its circumference. A number of jet outlets 26 of previously known design are connected to the pressure pipe 25 and are leading into the interior of the tub. The pump motor 22 is connected to a mains voltage of e.g. 230V, and the pump motor is arranged to drive the pump 20 in a known fashion to suck in bathing water through the suction valve 24 and the suction pipe 23 and to pump the water into the pressure pipe 25. The water will then flow under pressure through the pressure pipe and back into the bubble bath tub 10 through the jet outlets 26. Thereby the bubbling effect is achieved, which has given rise to the term bubble bath. Furthermore, the water may be mixed with air in a well-known way, before the water is fed through the jet outlets. The degree of air in the outgoing water affects the intensity and shape of the water jet. For optimum comfort the water jet intensity may be controlled by the bathing person.

Figure 2:
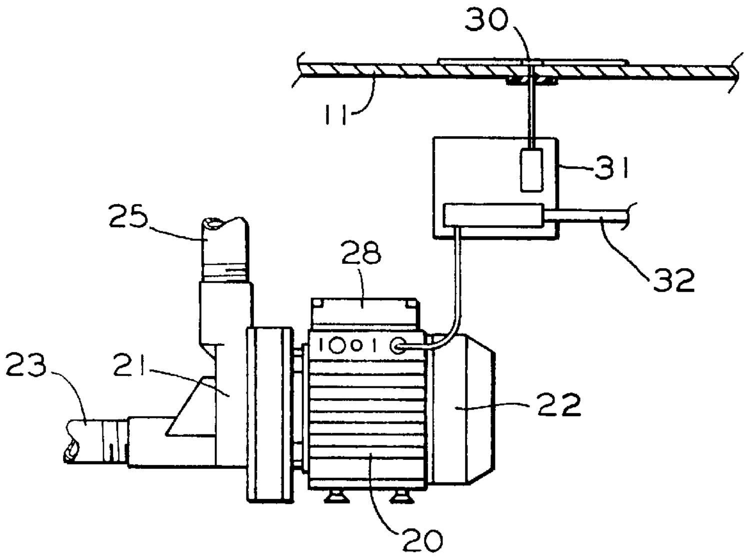
FIG. 2 illustrates a previously known arrangement for controlling and indicating the operational status of a mains-operated device in a sanitary environment, such as a water pump in a bubble bath system.

As previously mentioned indication must take place, when the pump 20 is operating. As a comparison a previously known control and indication arrangement is shown in FIG. 2. The pump 20, the pump housing 21, and the pump motor 22 are all equivalent to the ones shown in FIG. 1. Furthermore, the suction and pressure pipes 23, 25 are arranged as in FIG. 1. A touch control type control means 30 is arranged on the edge 11 of the bubble bath tub for controlling the pump motor operation. A light source constituted by a light emitting diode is arranged in connection with said control means for indicating the pump operation by turning on the light source. The control means as well as the light source are connected to a circuit board 31, the purpose of which among other things is to supply the former with power. Due to the regulations described above the power supply may only take place at maximum 12V, and hence the circuit board is provided with a transformer, the purpose of which is to convert the mains voltage at 32 to a lower and harmless voltage.

Figure 3:
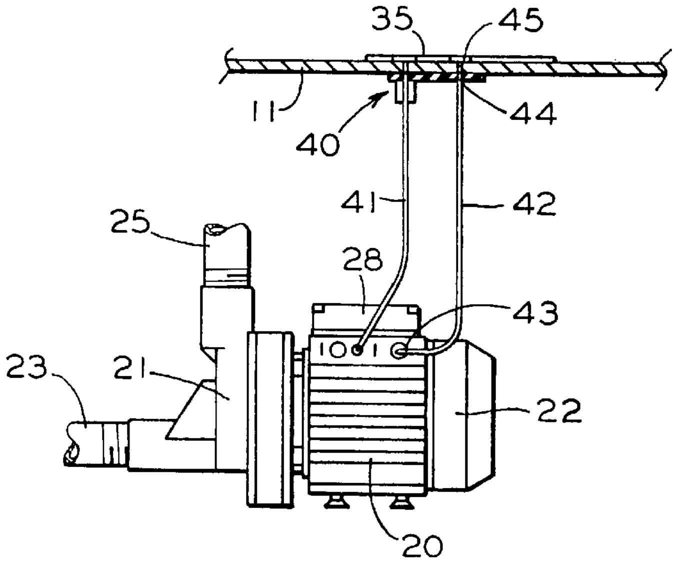
FIG. 3 is a side view of a first preferred embodiment of the remote control and indication system according to the invention.

In FIG. 3 there is shown a new way, according to a first preferred embodiment of the the invention, of providing remote control and indication of, for instance, the pump motor described above. The pump 20, the pump housing 21, the pump motor 22, the suction pipe 23, and the pressure pipe 25 are all equivalent to the ones described above. A pneumatic control means 40 is mounted on the edge 11 of the bath tub for controlling the pump motor operation, said pneumatic control means being previously known per se. By means of the control means 40 a switch in the pump motor may be turned on and off, respectively, through an air column in a hose 41. Furthermore, a fibre-optical light carrier 42 is arranged to indicate the pump motor operation. A first end 43 of the light carrier is inserted into the interior of the upper part 28 of the pump motor 22 through a tight conduit entry, and a second end 44 of the light carrier is connected to a hole 45 in the edge 11 of the bath tub.

Figure 11:
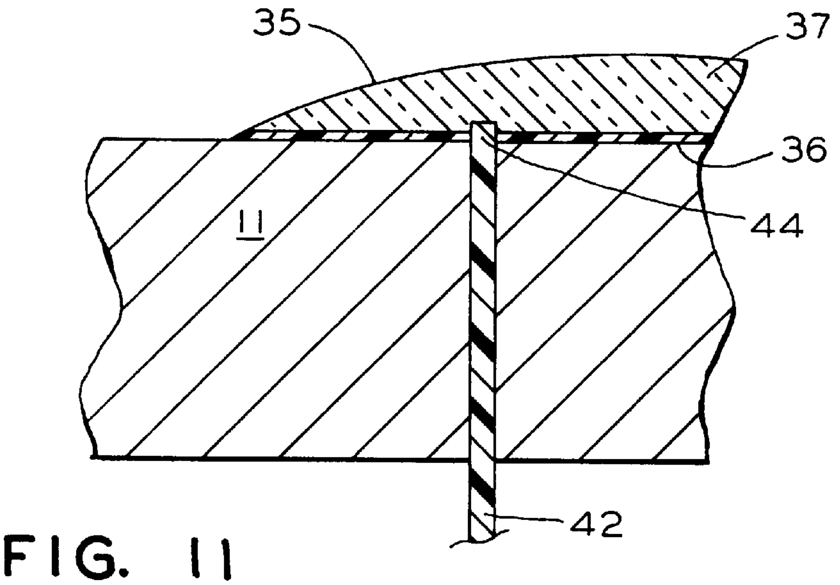
FIG. 11 is a fractional and sectional view of the transparent emblem and a light carrier.
Figure 4:
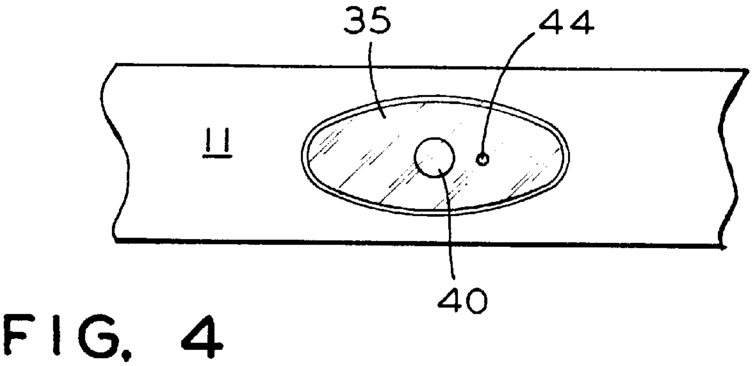
FIG. 4 is a top view of a transparent display and control emblem used in the embodiment according to FIG. 3.

According to FIG. 4 and 11 an emblem 35 is attached to the edge 11 of the bath tub 10. The back side 36 of emblem 35 is provided with holes for reception of the pneumatic control means 40 and the second end 44 of the light carrier 42, respectively. Preferably, the emblem 35 is provided with a flexible and transparent coating 37, made from e.g. polyurethane. Furthermore, the back side 36 may be provided with an adhesive in order to facilitate the attachment to the bath tub. Any desired information or symbols may be printed on the emblem, such as a company logotype (schematically shown as "[logo]" in the figures), informative texts describing the function being indicated by the light carrier (such as "pump on/off"), etc.

Figure 5:
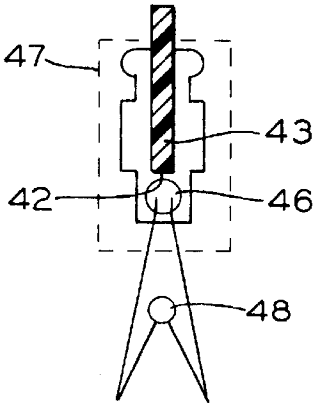
FIG. 5 is a schematic view of an indication light source arrangement used in the embodiment according to FIG. 3.

A light source 46 is according to FIG. 5 arranged at the first end of the light carrier 42 inside the pump motor housing. The light source 46 and the first end of the light carrier 42 are firmly fixed by a tight conduit entry 47. To protect the light source 46 from damage due to high voltages, for instance when the pump motor 22 is turned on or off, an over-voltage protection means 48 is arranged in parallel with the light source 46.

By means of suitable electric circuitry well-known to a man skilled in the art the light source 46 is controlled in such a way, that the light source is turned on, when the pump 20 is in operation, and is turned off, when the pump 20 is not in operation. Hence, when the light source is turned on, light is emitted to the first end 43 of the light carrier 42, said light then being guided through the light carrier to the second end 44, which is visibly mounted on the bath tub edge 11 inside the transparent emblem 35. In this way the pump motor operation is indicated to a bathing person on an optical basis rather than an electrical one, thereby obviously eliminating the risk of an electrical accident.

According to the first preferred embodiment the light carrier 42 consists of a homogeneous mono-filamentary cable of a polymeric material. The diameter of the cable is selected to 3 mm, but it is apparent that the diameter may be varied between e.g. 1 and 10 mm or more depending on the actual application. Even the selection of material may be varied among the various optical carriers available on the market. At present, the embodiment above is regarded to be the most suitable.

The light source 46 is preferably constituted by a conventional light emitting diode (LED), which is able to transmit light within a wavelength interval visible to the human eye, e.g. within the red, green, or yellow interval. However, also other simple sources of light may be used.

A second preferred embodiment of the invention will now be described with reference to FIGS. 6–9. In this embodiment the remote control and indication system utilises a combined light carrier and control line 50, which may be made from the same or similar material as the optical carrier 42 described above but which is provided with a tubular cavity 51 along the central axis. The pump 20, the pump housing 21, the pump motor 22, the suction pipe 23, and the pressure pipe 25 are all equivalent to the ones described above. A combined control and indication means 52 is mounted on the edge 11 in connection with an emblem 35, said means 52 preferably being made from a transparent, flexible and air/liquid-tight material, such as any suitable mix of rubber and plastics. The tubular cavity of line 50 is preferably filled with air or a hydraulic liquid. By actuating the control and indication means 52 (i.e. pressing it) the user may operate the pump motor at his desire via a hydraulic or pneumatic force in line 50, said force actuating a pressure sensitive switch inside the pump motor housing. At the same time the operational status of the pump motor may be visually indicated to the user by means of the surrounding light-carrying parts of line 50. The control and indication means 52 is provided with a bleeding nipple 53 for venting any air trapped inside the means.

Figure 6:
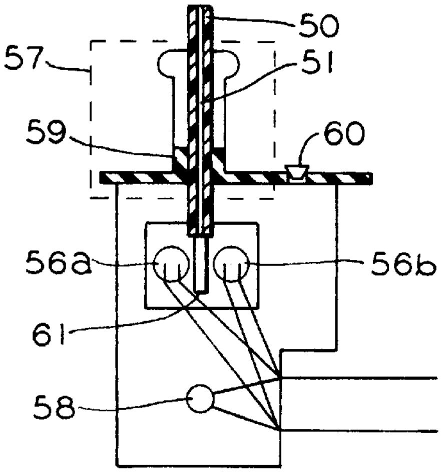
FIG. 6 is a schematic view of a combined indication light source and pneumatic control arrangement used in a second preferred embodiment according to FIG. 7.
Figure 7:
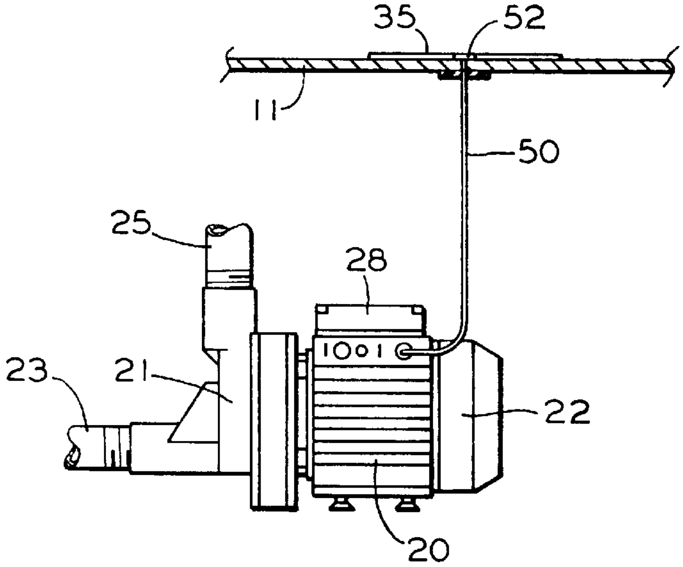
FIG. 7 is a side view of a second preferred embodiment of the remote control and indication system according to the invention.
Figure 8:
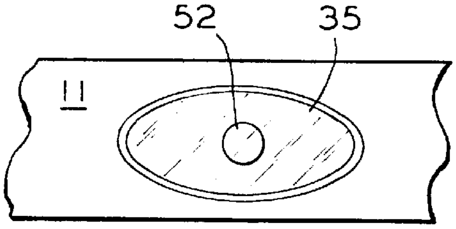
FIG. 8 is a top view of a transparent display and control emblem used in the embodiment according to FIG. 7.
Figure 9:
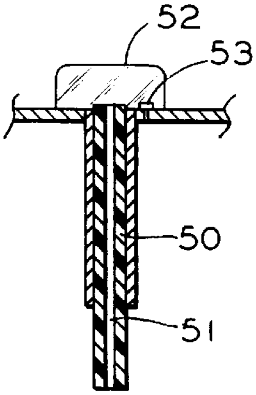
FIG. 9 is a schematic view of a combined indication and control means used in the embodiment according to FIG. 7.

FIG. 6 schematically illustrates a section inside the pump motor for receiving the control and indication line 50 through a tight conduit entry 57. An expander gasket 59 provides an air/liquid-tight seal. A bleeding nipple 60 is provided for venting any undesired air trapped inside the device. Two sources of light 56*a–b*, preferably LEDs, are connected to the first end of the control and indication line 50 under protection from an over-voltage protection means 58. In a way similar to the one described above the sources of light 56*a–b* are arranged to emit light to the line 50 in response to the operational status of the pump motor, said light then being guided through line 50 to means 52, where it is visible to the human eye of the user.

The tubular fluid-filled cavity 51 is connected to a means 61 for transferring the pressure pulse received through line 50 (said pressure pulse being generated by the user when pressing the control and indication means 52) to a pressure-operated pump motor switch not shown in the figure.

Hence, the combined control and indication line 50 acts as a bidirectional carrier of control signals (pressure pulses propagating from means 52 at the bath tub edge 11 to the pump motor) and indication signals (light transmitted from the pump motor section to means 52), respectively.

The fluid in the tubular cavity 51 is advantegously constituted by a fluorescent liquid in order to intensify the illuminating effect from the light transmitted through the surrounding parts of line 50.

As an alternative, the combined control and indication line 50 may comprise a hollow tube or hose filled with a suitable fluid and furthermore containing a thin optical fibre inside the tube or hose.

Figure 10:
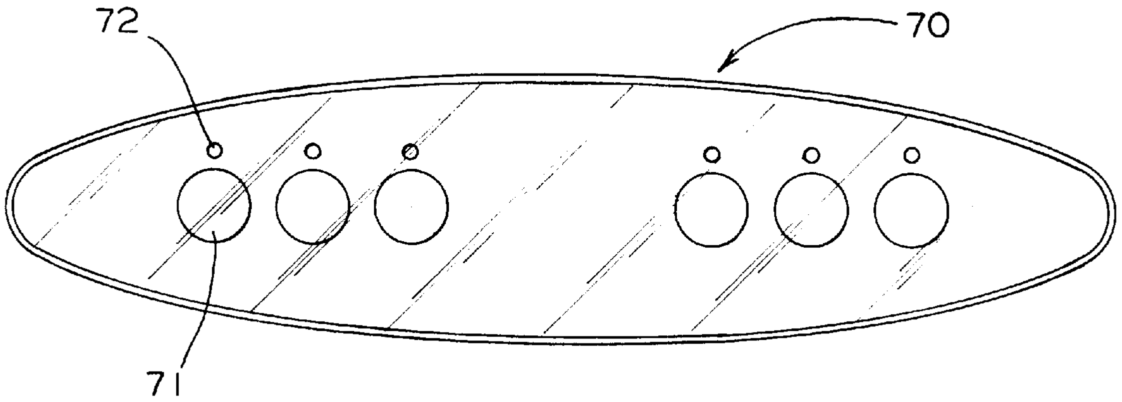
FIG. 10 is a top view of a transparent emblem for indication of a plurality of bathing parameters.

The remote control and indication system according to the invention may optionally embrace simultaneous control and indication of a plurality of parameters and functions, in contrast to the examples above with only one control and indication function (switching the pump motor on and off). In FIG. 10 there is shown an example of such an emblem 70 comprising a plurality of control means 71 and indication means 72.

By means of a remote control and indication system according to the invention, comprising simple and non-expensive components such as LEDs, optical fibres and pneumatic or hydraulic actuators and fluid lines, an electric device may be controlled as well as monitored in a sanitary environment in a way, which is harmless and which may be carried out at a substantially lower cost as compared to previously known devices, such as the one shown in FIG. 2. Rough estimates of material costs show that a reduction of the material costs to one tenth of the original cost is quite possible. Furthermore, the emblem may easily be given any desired shape, size or appearance, due to the simplicity in its design.

According to the above the present invention has been described as applied to bubble baths. Within the scope of the invention, as defined in the appended patent claims, the invention may be applied in various different ways and according to various different embodiments. E.g., the control and indication emblem 35, which according to the above has been described as being attached to the edge 11 of the bubble bath tub, may as an alternative be arranged at another place within the sanitary environment, e.g. on a separate console or the like.

Furthermore, the invention is applicable also in other sanitary environments, in which there is a need for a non-expensive and harmless remote control and indication of an electric device used within the sanitary environment. Such examples are a steam generating device in a steam sauna, heating devices in various environments, cleaning or disinfecting devices in swimming-pools, wave generating devices in so-called adventure bath sites, etc.

I claim:

1. A remote control and indication system for an electric device (20, 22) in a sanitary environment, comprising:

at least one light carrier (42; 50) for indicating operational status information about the electric device to a user present in the sanitary environment, a first end (43) of said light carrier receiving light from at least one light source (46; 56*a–b*) at said electric device in response to the operational status of the electric device, and control means (40; 52) for controlling at least one function of the electric device (20, 22), said control means being connected to said electric device by at least one pneumatic or hydraulic pressure line (41; 51), wherein said control means (40; 52) and a second end (44) of said light carrier (42; 50) are adjacently arranged at a position in the sanitary environment, which is visible and accessible to the user.

2. A remote control and indication system according to claim 1, further comprising at least one display emblem (35; 70), said emblem being adapted to receive the second end (44) of said light carrier (42) and being mounted at said position, which is visible and accessible to the user.

3. A remote control and indication system according to claim 2, further comprising a transparent and flexible coating (37) covering a front side of said emblem (35).

4. A remote control and indication system according to claim 2 or 3, wherein at least a part (37) of the emblem (35) is made from polyurethane.

5. A remote control and indication system according to claim 2, further comprising an adhesive surface on the back side (36) of the emblem (35).

6. A remote control and indication system according to claim 1, further comprising a combined control and light carrier line (50) of an optically transparent material, a first end of said line being connected to the electric device (20, 22) and a second end of said line being connected to a pressure actuation means (52) at the position (11) in the sanitary environment, which is visible and accessible to the user, and a tubular cavity (51) along the central axis of the line (50), said cavity containing a fluid for transferring an actuating force from the actuation means (52) to the electric device.

7. A remote control and indication system according to claim 6, wherein said actuation means (52) is made from transparent rubber and/or plastic materials.

8. A remote control and indication system according to claim 1, further comprising a combined control and light carrier line (50), a first end of said line being connected to the electric device (20,

22) and a second end of said line being connected to a pressure actuation means (52) at the position (11) in the sanitary environment, which is visible and accessible to the user, wherein said line (50) comprises a fluid for transferring an actuating force from the actuation means (52) to the electric device, and said light carrier (42; 50) is arranged inside said line (50).

9. A remote control and indication system according to claim 6 or 8, wherein said fluid is a fluorescent liquid.

10. A remote control and indication system according to claim 1, wherein the light carrier (42; 50) is constituted by a fibre-optical cable.

11. A remote control and indication system according to claim 10, wherein the fibre-optical cable (42; 50) consists of a homogenous mono-filamentary polymeric material and has a diameter of between 1 and 10 mm.

12. A remote control and indication system according to claim 1, wherein the light source (46; 56*a*–*b*) is constituted by a light emitting diode.

13. A remote control and indication system according to claim 1, wherein the electric device (20, 22) comprises an electric pump motor (22), which is arranged to drive a pump (20, 21, 22) for generating bubbles in a bubble bath tub (10).

14. A remote control and indication system according to claim 1, wherein said second end (44) of the light carrier (42; 50) is connected to the edge (11) of a bubble bath tub (10).

* * * * *